(12) United States Patent
Lewis et al.

(10) Patent No.: US 7,802,709 B1
(45) Date of Patent: Sep. 28, 2010

(54) UNIVERSAL HANGER CARGO CARRIER FOR A BOAT TRAILER

(76) Inventors: Jeffrey Thomas Lewis, 8707 Old Olympic Hwy., Sequim, WA (US) 98382; Robert Mark Matriotti, 255 Joslin Rd., Sequim, WA (US) 98382

( * ) Notice: Subject to any disclaimer, the term of this patent is extended or adjusted under 35 U.S.C. 154(b) by 853 days.

(21) Appl. No.: 11/729,204

(22) Filed: Mar. 28, 2007

Related U.S. Application Data

(60) Provisional application No. 60/790,199, filed on Apr. 7, 2006.

(51) Int. Cl.
*B60R 9/00* (2006.01)
*B60R 7/00* (2006.01)

(52) U.S. Cl. ............... 224/560; 224/547; 224/42.32; 224/401

(58) Field of Classification Search ........... 224/560, 224/547, 42.4, 42.32, 401
See application file for complete search history.

(56) References Cited

U.S. PATENT DOCUMENTS

| 1,638,216 | A |   | 8/1927 | Rose et al. |   |
|---|---|---|---|---|---|
| 2,497,597 | A |   | 2/1950 | Gatewood |   |
| 2,635,939 | A |   | 4/1953 | Obenchain |   |
| 2,904,237 | A | * | 9/1959 | Wasyluk | 224/409 |
| 3,175,743 | A | * | 3/1965 | Richard | 224/549 |
| 3,779,580 | A |   | 12/1973 | Thelen |   |
| 3,880,335 | A |   | 4/1975 | Winkler |   |
| 3,955,727 | A | * | 5/1976 | Montgomery | 224/417 |
| 4,247,030 | A |   | 1/1981 | Amacker |   |
| 4,249,684 | A |   | 2/1981 | Miller et al. |   |
| 4,279,365 | A | * | 7/1981 | Hutmacher | 224/406 |
| 4,376,502 | A | * | 3/1983 | Cohen | 224/411 |
| 5,294,026 | A | * | 3/1994 | McGirt | 224/549 |
| 5,799,961 | A | * | 9/1998 | Schmeets | 280/163 |
| 5,855,309 | A | * | 1/1999 | Hallsworth | 224/401 |
| 5,875,902 | A |   | 3/1999 | Emery et al. |   |
| 6,032,842 | A | * | 3/2000 | Brickner | 224/560 |
| 6,045,022 | A | * | 4/2000 | Giles | 224/532 |
| 6,065,916 | A | * | 5/2000 | Swensen | 410/97 |
| 6,202,909 | B1 | * | 3/2001 | Belinky et al. | 224/524 |
| 6,253,981 | B1 |   | 7/2001 | McLemore |   |
| 6,401,996 | B1 | * | 6/2002 | Thom et al. | 224/407 |
| 6,412,675 | B1 | * | 7/2002 | Pope | 224/560 |
| 6,502,728 | B2 |   | 1/2003 | Savant |   |
| 6,523,846 | B1 |   | 2/2003 | Bennett |   |
| 6,769,546 | B2 | * | 8/2004 | Busch | 206/571 |
| RE38,895 | E |   | 11/2005 | McLemore |   |
| 7,316,339 | B2 | * | 1/2008 | Zhang | 224/499 |
| 2006/0011754 | A1 |   | 1/2006 | Farmer |   |

* cited by examiner

*Primary Examiner*—Nathan J Newhouse
*Assistant Examiner*—Lester L Vanterpool
(74) *Attorney, Agent, or Firm*—Virginia P. Shogren

(57) ABSTRACT

A universal, adaptable hanger mounted cargo carrier for removable mounting over and around a trailer frame without requiring modification of either I-beam or box beam trailer rails. The carrier comprises a generally rectangular box with steel mesh floor and opposed inverted corner J-hook mounts for slidable mounting of the carrier over the trailer frame rail extending deep enough below the bottom of the rail to enable a locking mechanism to at least partially close the opening of the inverted J-hook below the frame. Inverted "U" shaped spacers reduce the size of the J-hook opening, thereby adapting the carrier for flush mounting on a range of different sized rails. A steel mesh floor and holes in the walls of the carrier for insertion of hook ends of bungee cords allow for retention and transport of objects of varying size and shape.

5 Claims, 6 Drawing Sheets

UNIVERSAL HANGER CARGO CARRIER FOR A BOAT TRAILER

CROSS REFERENCE TO RELATED APPLICATION

This is the Regular U.S. Patent Application of prior Provisional Patent Application Ser. No. 60/790,199 filed Apr. 7, 2006 by the same inventors, entitled "Cargo Carrier for Boat Trailers", the priority of which is hereby claimed under 35 USC 119(e), 120, and the disclosure of which is hereby incorporated by reference in its entirety.

FIELD OF THE INVENTION

The invention relates to package and article carriers, in particular, to an adjustable hanger cargo carrier removably mountable over the framework of a boat trailer for carrying and transporting a variety of supplies, goods and equipment for use in boating and ancillary activities.

BACKGROUND OF THE INVENTION

A common problem among boaters is that there is not enough space to haul all the miscellany of fuel, food, supplies, materials, and equipment, plus all of the people who need transportation to a lake, oceanfront, river or other boating site. Boats are commonly transported on trailers from the place of storage to the place of use. Once the vehicle space is allocated to people and whatever can be carried in the vehicle, no additional space is available except in the boat hull where it is not advisable, safe or convenient to carry equipment, material, supplies or people. Loose equipment and supplies placed in the boat may be thrown during transport, break open and spill contents or bounce out, and in the process create a safety hazard during transport.

Commercially available boat trailers typically comprise a tongue at the leading edge of a double rail frame, with the front end of the two rails coming together at the trailing end of the tongue, forming a generally "Y" shaped trailer. The front of the tongue (the base of the "Y") fastens to the trailer hitch at the back of the towing vehicle. When on the trailer, the bow of the boat is above the front, merging end of the two rails where they converge. The trailer rails commercially available in the United States come in varying widths at intervals of 2 inches (5.1 cm), 2.5 inches (6.4 cm) and 3 inches (7.6 cm).

Various vehicle-top carriers and trailer hitch auxiliary carriers are available, and while they may contribute to alleviating the cargo problem, they have definite drawbacks, such as increasing the vehicle height and center of gravity, or increasing vehicle length. Using a trailer hitch carrier also precludes use of the trailer hitch for towing a trailer. Accordingly, there continues to be a need for increased cargo capacity within the existing envelope of the unmodified vehicle-boat-and-trailer space.

U.S. Pat. No. 5,855,309 to Hallsworth discloses one example of a cargo carrier for boat trailers. The carrier disclosed in Hallsworth comprises a rectangular-shaped frame made of angled channels with a metal hinged strap for fitting through the handle of a five gallon gas can or ice chest. A second embodiment comprises an I-Frame formed by two angled channels separated by telescoping adjustable plates. In both embodiments, one side of the angled channels is bolted to the boat trailer frame via a bracket overlapping the top side of the trailer rail. Mounting of the cargo frame disclosed in Hallsworth requires the time, effort and tools to drill holes into the trailer rail at specified points to bolt the cargo frame to the rail.

As a result, the Hallsworth cargo frame cannot be removed easily and would likely become a permanent fixture to the trailer frame once mounted. Nor may its position along the trailer rail be adjusted without drilling additional holes along the course of the metal rail. Drilling of holes in the metal trailer rail may lead to rust and corrosion around the holes and weaken the strength of the rail. In addition, the Hallsworth cargo frame is designed for retaining square or rectangular-shaped objects, only, having a flat base of a dimension that spans the width of the bottomless frame, such as five gallon gas cans or ice chests.

Accordingly, there is a need in the art for a trailer cargo carrier that is both quick and easy to mount onto, and remove from, the trailer rail; that is easily adjustable along the length of the rail; that may be mounted to a variety of rails of different widths; that may be mounted to rails without the need for drilling holes into the rail, and can be used to carry and transport a variety of different sized and shaped objects.

THE INVENTION

Summary of the Invention

The present invention is a cargo carrier comprising a horizontally-oriented basket assembly attached to dual hanger type inverted J-hook mounts to retain the basket assembly against a boat trailer through slidable insertion of the J-hook mounts over and around the trailer rail. Spacers or adapters either slidably mounted on the trailer rail or mounted to the inside perimeter of the J-hook mounts allow for mounting of the carrier on trailer rails of different widths. The inventive cargo carrier provides additional cargo capacity without increasing the overall envelope of the trailer, boat, and towing vehicle configuration.

The basket assembly comprises a four-sided, generally rectangular open tray or box on the order of 4 inches to 12 inches (10.2 cm to 30.5 cm) deep with a continuous steel mesh floor. The walls of the basket assembly are made of angle iron or steel material. In an alternate embodiment, both the walls and the floor are mesh.

The cargo carrier is cantilever mounted to the trailer frame by hanging inverted J-hook mounts over the top of the trailer rail. The inverted J-hook mounts are located at opposed corners of the cargo carrier. The inverted "U" shaped opening of the inverted J hook mount fits over a wide range of boat trailer side rails and is deep enough to extend below the bottom of the trailer frame member.

A locking mechanism, such as a bolt, padlock or bar partially block or completely close the opening of the inverted J hook below the frame, thereby preventing the carrier from being thrown off the trailer rail, and preventing the theft of the carrier from an untended trailer. "U"-shaped spacer inserts are available as adapters to reduce the size of the J-hook opening, thereby adapting the cargo carrier for flush mounting on different sized trailer frames.

The inventive cargo carrier is especially adapted to be cantilever mounted on the trailer frame beneath the port or starboard bow of the boat (or both) to take advantage of the unused space below the bow, but does not extend beyond the perimeter of the trailer wheels. As a result, the cargo carrier is safely secured within the envelope of the trailer and does not pose a hazard to passing traffic.

Neither box beam nor I-beam trailer rails require modification, such as drilling of holes, welding of special brackets, or the like, to accept the inventive cargo carrier mounts. The inventive carrier may be provided fully assembled or in kit form. The entire assembly can be broken down into, and packaged in boxes of 4 foot (1.22 m) lengths for ease of standard carrier shipping.

When not in use, the inventive cargo carrier does not interfere with normal use of the trailer. The carrier may remain mounted to the trailer rail, or easily removed, used for multiple trailers of same or different rail widths, or may be removed for storage.

The cargo carrier is not limited in design for carrying a specific item or size of item. Rather, cargo of various sizes, dimensions, and parts (e.g., coolers, gas tanks, bags, chopped wood, tackle boxes, or combinations thereof) may be stored and transported in the inventive cargo carrier. Cargo carrier hold downs retain the items in the basket assembly. Stretchable bungee cords, ropes, or other ties may be used to secure the load.

BRIEF DESCRIPTION OF THE DRAWINGS

The invention is described in more detail with reference to the attached drawings, in which.

DETAILED DESCRIPTION

The following detailed description illustrates the invention by way of example, not by way of limitation of the scope, equivalents or principles of the invention. This description describes several embodiments, adaptations, variations, alternatives and uses of the invention.

In this regard, the invention is illustrated in the several figures, and is of sufficient complexity that the many parts, interrelationships, and sub-combinations thereof cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
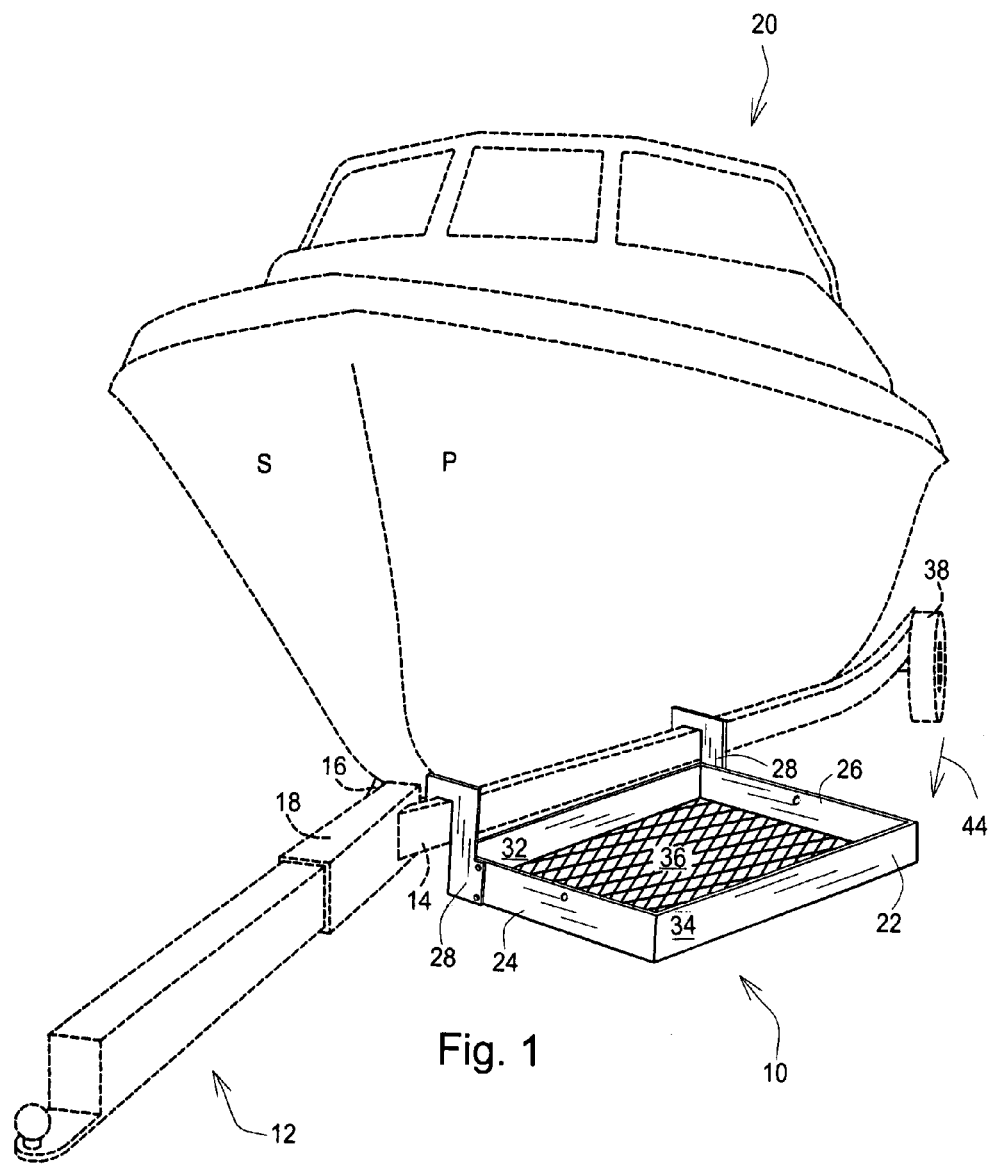
FIG. 1 is a perspective view of a boat mounted on a trailer with the inventive cargo carrier mounted on a rail of the trailer frame beneath the port bow of the boat.

FIG. 1 shows the preferred embodiment of the inventive cargo carrier 10 installed on the port rail 14 of a boat trailer 12 prior to the loading of cargo into the carrier 10. As shown in FIG. 1, the port rail 14 and starboard rails 16 come together at a forward end and join at the base of the trailer tongue 18. The boat trailer 12 is shown retaining boat 20.

Figure 3A:
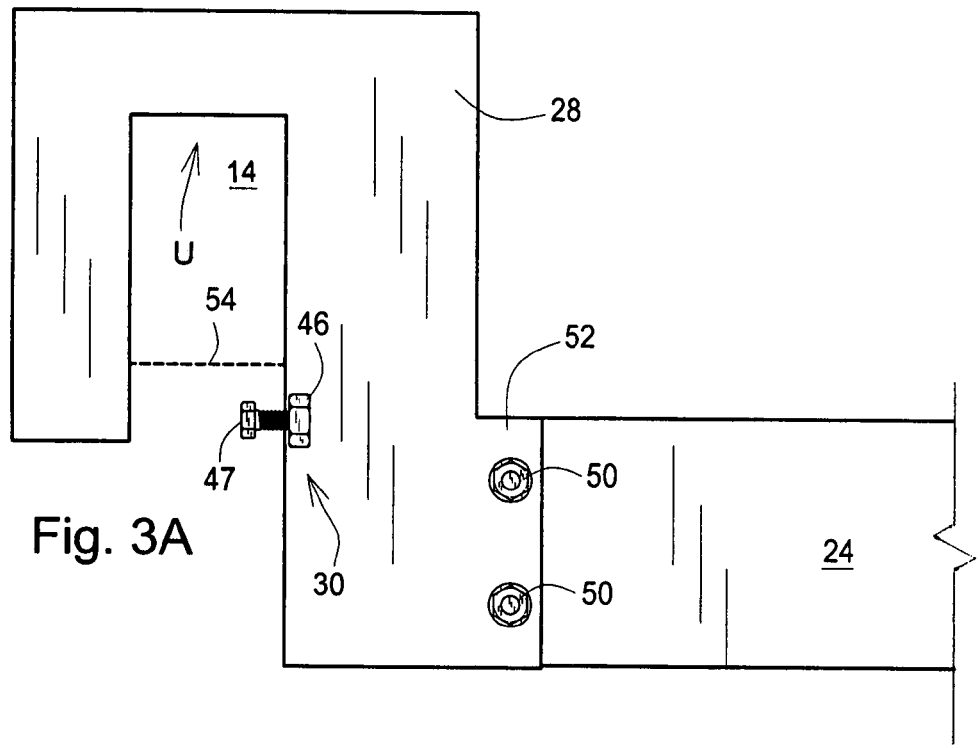
FIG. 3A is a partial elevation view of the J-hook mount with bolt locking mechanism.
Figure 3B:
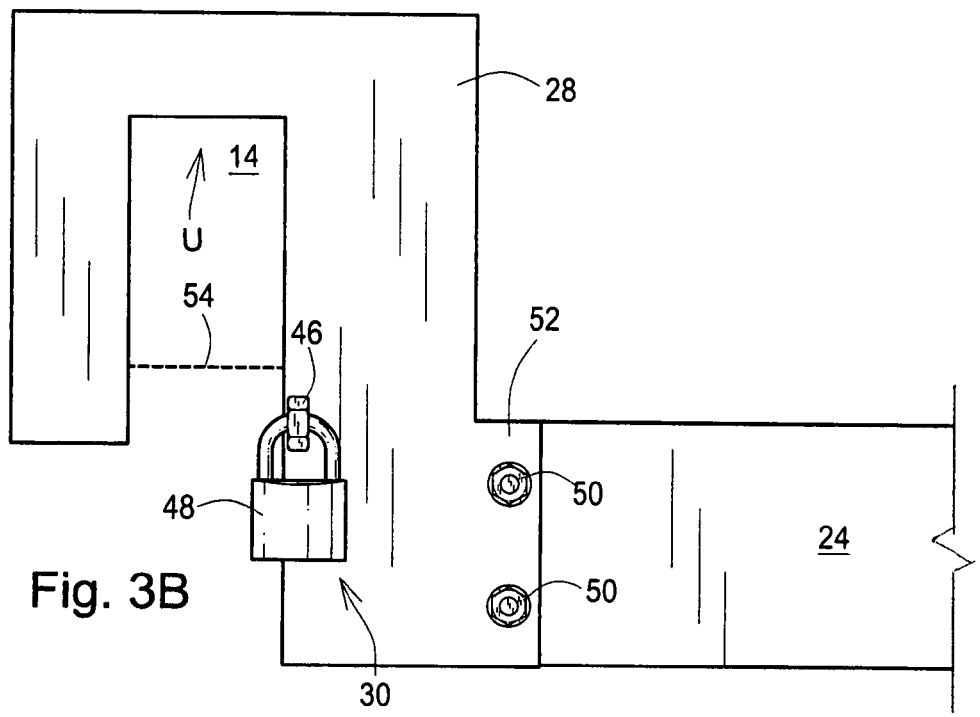
FIG. 3B is a partial elevation view of the J-hook mount with padlock locking mechanism.

In the preferred embodiment shown in FIG. 1, the inventive carrier 10 comprises a generally rectangular box-shaped basket assembly 22 including a base or floor portion 36, opposed inboard and outboard side walls 32, 34, opposed left and right side walls 24, 26, each of the side walls interconnecting the base 36. Two, spaced inverted J-hook mounts 28 are attached to the basket assembly 22. Each of the J-hook mounts 28 is shaped to form an inverted generally U-shaped opening as shown in FIGS. 3A and 3B. The J-hook mounts 28 are shaped for slidable, removable hanger mounting over the side rail 14 of the boat trailer 12 preferably proximate the trailer tongue 18 and underneath the bow of the boat 20. The U-shaped opening of the J-hook mount has a closed top end and an open bottom end, and is shaped to come into flush contact with the top and side surfaces of the boat trailer rail when the carrier is mounted.

More than two J-hook mounts 28 may be attached to the carrier 10, as desired, for example, if the basket assembly 22 were long and narrow. One or more cargo carriers 10 may be mounted on the starboard rail 16 and/or port rail 14 of a boat trailer 12.

As discussed further in connection with FIGS. 3A and 3B, each J-hook mount 28 comprises a locking mechanism 30 proximate the bottom end of the U-shaped opening of the J-hook mount 28 as a safety measure against unauthorized removal and unavoidable road jolts causing one or more of the J-hook mounts 28 to be pushed off the trailer rail 14/16 during transport. As discussed further in connection with FIG. 6, the cargo carrier 10 further comprises at least one cargo hold down, such as a bungee cord, with opposed attachment ends for attachment to the basket assembly, thereby securing the load in the cargo carrier 10.

Referring to FIG. 1, the inboard sidewall 32 is closest to the boat trailer 12 when installed, and the outboard sidewall 34 is furthest from the boat trailer 12 when installed. Left side wall 24 is closer to the bow of the boat 20 when the carrier 10 is installed on the port rail 14; the right side wall 26 is closer to the bow of the boat 20 when the carrier 10 is installed on the starboard rail 16.

As shown in FIG. 1, the basket assembly 22 is generally rectangular in shape, but may be any desired shape, including a curved shape, and of any desired depth, provided the outboard side wall 34 of the carrier 10, when mounted to the rail 14, 16 of a trailer 12, does not protrude past the wheel tracking line 44 for the trailer wheel 38. Because the inventive cargo carrier 10 does not protrude beyond the wheel line 44, it occupies space within the original overall envelope of the vehicle, trailer, and boat, and does not pose a safety risk to other vehicles on the road.

Side walls 24, 26, 32 and 34 are formed with angle iron bent or welded at the corners. J-hook mounts 28 are formed of ¼ inch (0.635 cm) mild steel plate and are shown bolted to side walls 24, 26, respectively, but could be welded. Base 36 of the basket assembly 22 is constructed of steel or wire mesh welded to the internal corners of the angle iron side walls 24, 26, 32, 34. The preferred dimensions of the basket assembly 22 are 44 inches (long) by 20 inches (wide) by 4 inches (deep), but any suitable or desired dimensions for the side walls 24, 26, 32, 34 and corresponding dimensions for the base 36 may be utilized, and one or more inventive carrier(s) 10 may be mounted at any location along the trailer rail(s) 14/16 provided the outboard side wall 34 does not protrude past the wheel tracking line 44 for the trailer wheel 38.

The preferred embodiment of the inventive carrier 10 is a unitary version using all-weld construction with the J-hook mounts 28 bolted to the external sides of left and right side walls 24, 26. However, the carrier parts may be welded, riveted and/or bolted together. Plastic parts, if of sufficient strength, can be substituted for metal parts.

Figure 2A:
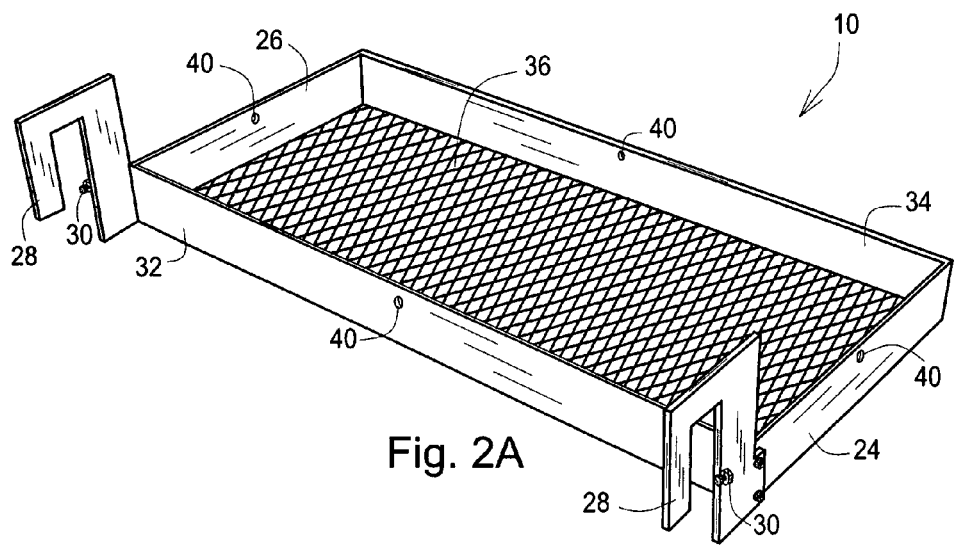
FIG. 2A is a perspective view of an unmounted first embodiment of the inventive cargo carrier.

FIG. 2A shows an inboard isometric view of an unmounted preferred embodiment of the inventive cargo carrier 10. As shown in FIG. 2A, the base of the two inverted J-hook mounts 28 are bolted to sidewalls 24 and 26 and serve as the principle corner members. Holes 40 approximately 0.5 inches in diameter (1.3 cm) are drilled into the center of sidewalls 24, 26, 32, 34 proximate the top margin of each side wall. The holes 40 are used in securing cargo retained by the carrier 10. Attachment hook ends of bungee cords (shown in FIG. 6) may be angled inside and through the one or more holes 40 in the basket assembly 22 to span the open top of the carrier 10. Any number of desired holes 40 at any desired location(s) within the side walls 24, 26, 32, 34 may be utilized. Any suitable method for retaining the cargo within the carrier 10 may be utilized, including without limitation, bungee cords, ropes tied through the holes 40, and the like. One or more of the hook ends of the bungee cord(s) or rope ends could alternately be secured in the openings formed by the mesh bottom 36 or sidewalls if the walls are also constructed of steel mesh as shown in FIG. 2B.

Figure 2B:
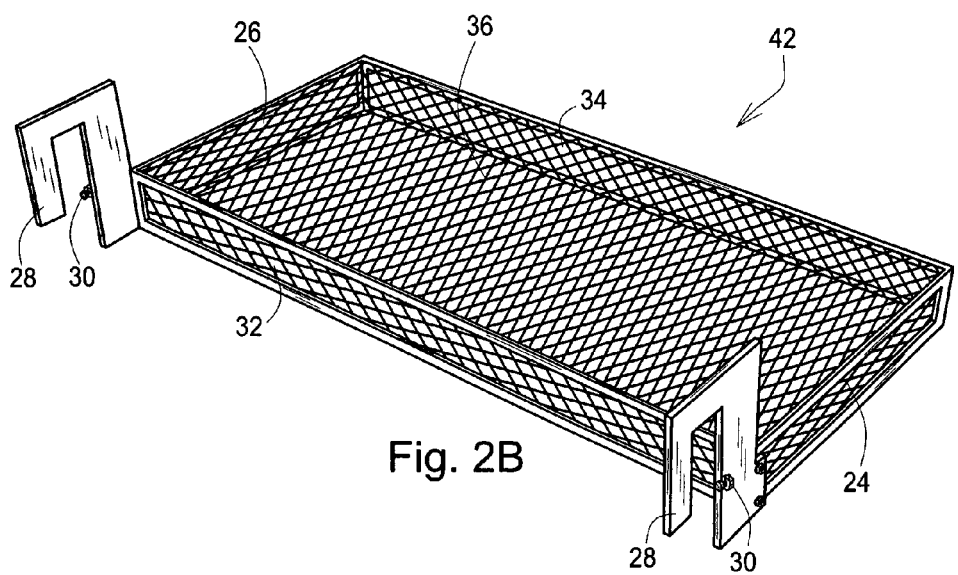
FIG. 2B is a perspective view of an unmounted second embodiment of the inventive cargo carrier.

FIG. 2B shows a perspective view of an unmounted second embodiment of the inventive cargo carrier 42 constructed with mesh floor 36 and mesh side walls 24, 26, 32, 34. The outboard corners and lower edges are framed with angle iron.

FIGS. 3A and 3B show alternate embodiments of the locking mechanism 30 for the J-hook mount 28. The purpose of the locking mechanism 30 is to hold the carrier 10 securely to the boat trailer frame 12 against either unauthorized removal or unavoidable road jolts. Each inverted J-hook mount 28 forms a U-shaped opening having a closed top end and an open bottom end. The locking mechanism 30 is positioned proximate the open bottom end of the U-shaped opening.

FIG. 3A shows a nut 46 and bolt 47 locking mechanism 30 for the J-hook mount 28. Lock nut 46 is welded to the outboard side of the J-hook mount proximate the open bottom end of the U-shaped opening. Lock nut 46 forms a hole for insertion of bolt 47. Bolt 47 is shown inserted into nut 46, but only partially screwed into nut 46. As a result, bolt 47 protrudes into the bottom end of the U-shaped opening. Line 54 runs across the bottom end of the U-shaped opening and represents the base of the rail 14 over which the J-hook 28 is slidably mounted. As shown by FIG. 3A, once the bolt 47 is partially screwed into lock nut 46, if the trailer rail 14 is jostled, or the J-hook mount 28 is jostled, the bolt 47 would come into contact with the base of the trailer rail 54 and would prevent the J-hook mount 28 from being thrown from the rail 14.

FIG. 3B shows a padlock 48 locking mechanism 30 for the J-hook mount 28. Nut 46, which may be a lock nut or other type of nut, is welded to the outboard side of the J-hook mount proximate the open bottom end of the U-shaped opening. Nut 46 forms a hole for insertion of a padlock 48 hasp. The hasp of padlock 48 is shown inserted into and through the hole formed by nut 46 and locked in place. As a result, portions of padlock 48 protrude into the bottom end of the U-shaped opening. Line 54 runs across the bottom end of the U-shaped opening and again represents the base of the rail 14 over which the J-hook 28 is slidably mounted. As shown by FIG. 3B, once the padlock 48 is locked in nut 46, if the trailer rail 14 is jostled, or the J-hook mount 28 is jostled, the base 54 of rail 14 would come into contact with the padlock 48 and would prevent the J-hook mount 28 from being thrown from the rail 14.

Any other suitable locking mechanism 30 could be employed, such as chains, lock bars, and the like. For example, the locking mechanism 30 could comprise a lock bar with lock bar guides. In this embodiment, the lock bar would be a steel rod bent at one end to form an integral L-shaped lock bar handle for easy gripping, rotation, and sliding back and forth through lock bar guides and in and out of a lock bar ring. A chain locking mechanism would comprise a chain attached at one end proximate the bottom end of the U-shaped opening with a latch hook at the other end of the chain that could be secured to the J-hook mount 28 after the inventive cargo carrier 10 is slidably mounted onto the trailer rail 14.

Figure 4A:
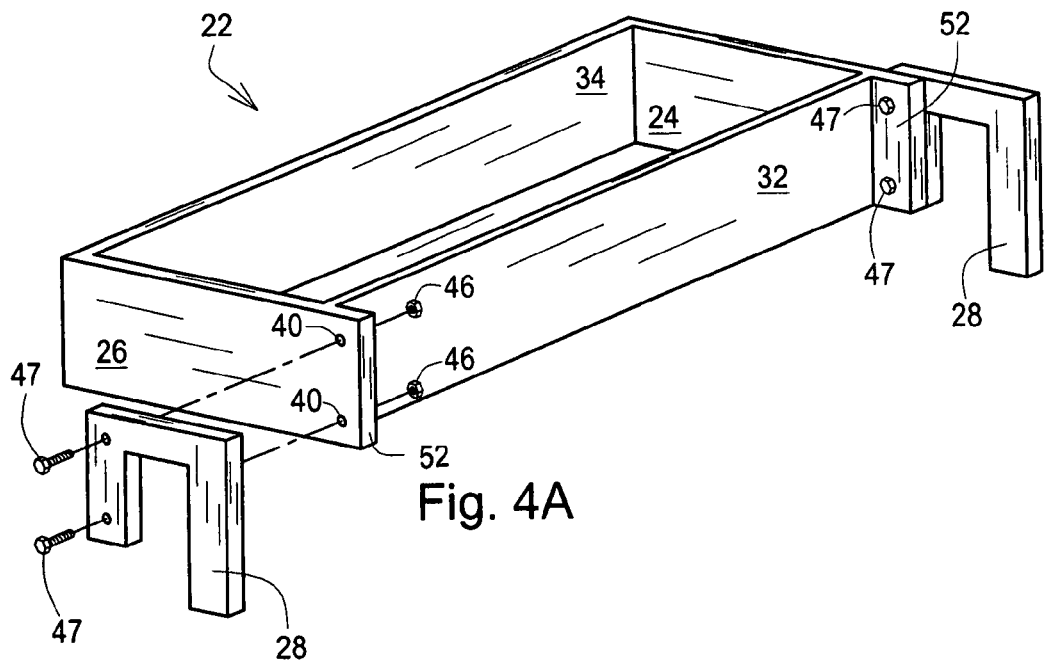
FIG. 4A is an isometric exploded view of an alternate embodiment of the J-hook mount.
Figure 4B:
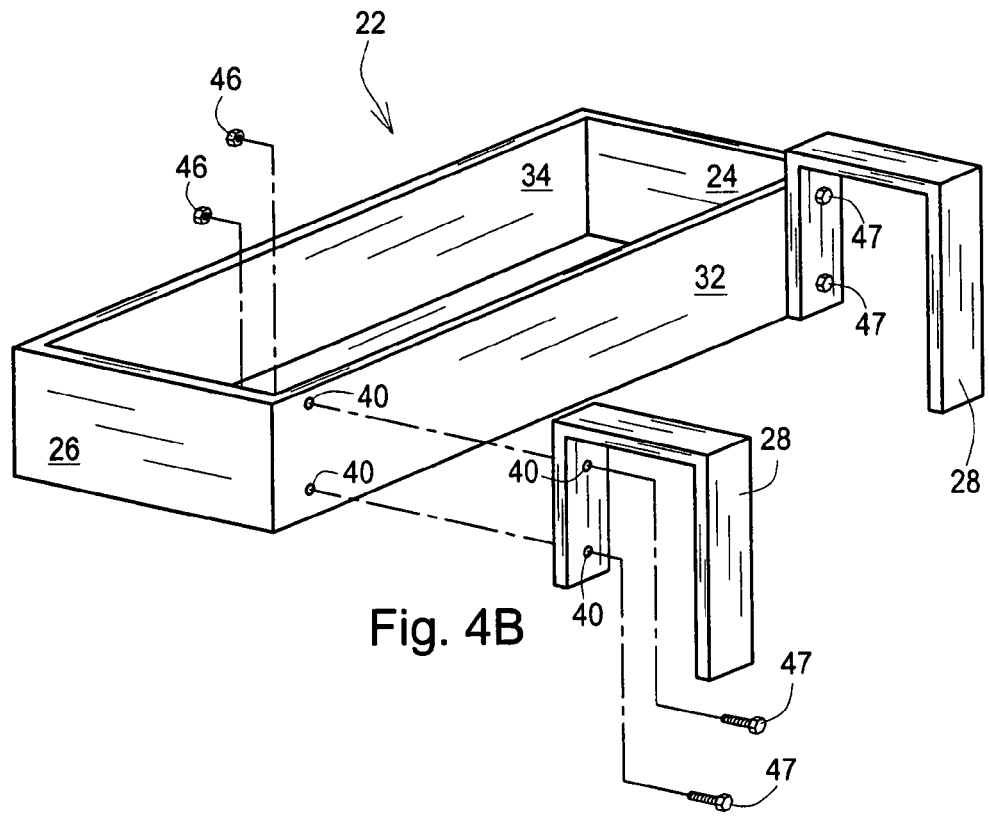
FIG. 4B is an isometric exploded view of an alternate embodiment of the J-hook mount comprising a strap-type hook.

FIGS. 4A and 4B are exploded isometric views of alternate embodiments for the J-hooks mounts 28. Referring to FIG. 4A, the J-hook mounts 28 are bolted to a flange 52 that is an extension of side walls 24, 26. Referring to FIG. 4B, the J-hook mounts 28 are integrated into the inboard side wall 32 as the vertical end-strut.

Figure 5A:
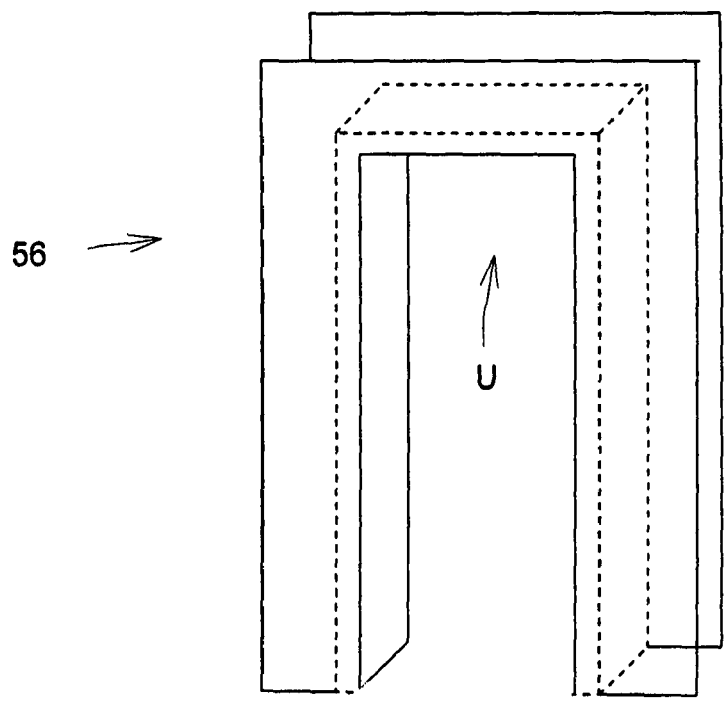
FIGS. 5A-5C are isometric views of different embodiments for an inverted "U"-shaped mounting spacer used with the inverted J-hook mount for mounting the cargo carrier to smaller trailer frames; and, FIG. 6 is a perspective view an unmounted embodiment of the inventive cargo carrier loaded with firewood.
Figure 5B:
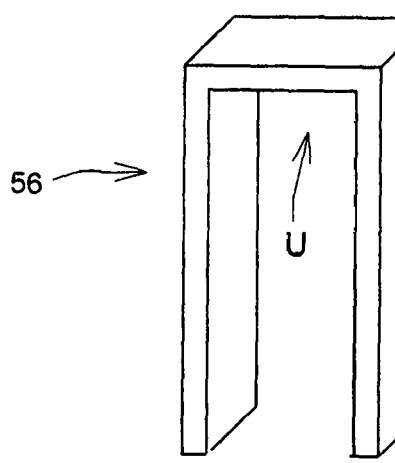
Figure 5C:
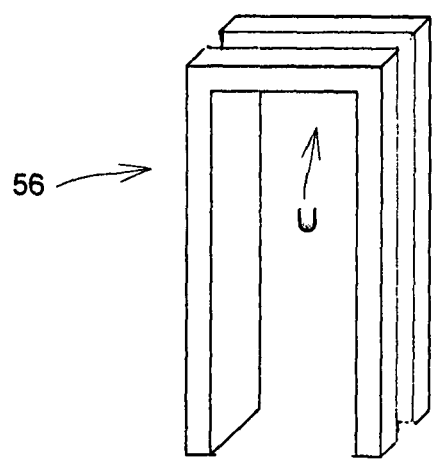

FIGS. 5A-5C show alternate embodiments for an inverted "U"-shaped mounting spacer or adapter 56 used with the inverted J-hook mount 28 for mounting the cargo carrier 10 to smaller trailer frames 12. FIG. 5A shows a generally-rectangular shaped spacer 56 with open base that forms a U shaped opening designed for flush mounting over the top of a trailer rail 14/16. Opposed flanges define a space around the perimeter of the adapter 56 over and into which the J-hook mount may be slidably inserted. FIG. 5B shows a generally-rectangular shaped spacer 56 with open base that forms a U shaped opening designed for flush mounting over the top of a trailer rail 14/16, but which does not include flanges. FIG. 5C shows a generally-rectangular shaped spacer 56 with open base that forms a U shaped opening designed for flush mounting over the top of a trailer rail 14/16 that includes a channel on its perimeter for slidable mounting and retention of the J-hook mount. Any suitable shape or design for an adapter 56 may be utilized; any number of adapters may be stacked on themselves to bring the size of the trailer rail 14/16 into conformity for the size of the U-shaped opening on the J-hook mount 28.

The spacer/adapter 56 may be constructed of steel plate, iron strap, robust plastics, or the like, provided the outside dimensions of the spacer 56 (or multiple, stacked spacers 56) fit inside the U-shaped opening of the inverted J-hook mount 28 as shown in FIGS. 3A and 3B. The inside dimensions of the adapter are selected such that it can be placed over a trailer frame 12 with a snug fit at the points that the J-hook mounts 28 will be placed when the cargo carrier 10 is mounted to the trailer frame 12. A J-hook mount 28 designed to fit the largest trailer frame 12 can thus be used with diverse mount spacers to fit smaller-dimension trailer frames. Alternately, the spacer 56 may be constructed of sturdy rubber tubing, vinyl tubing, or other bendable but sturdy material that can be retained around the inside perimeter of the U-shaped opening formed by the inverted J-hook mount 28 as shown in FIGS. 3A and 3B.

Figure 6:
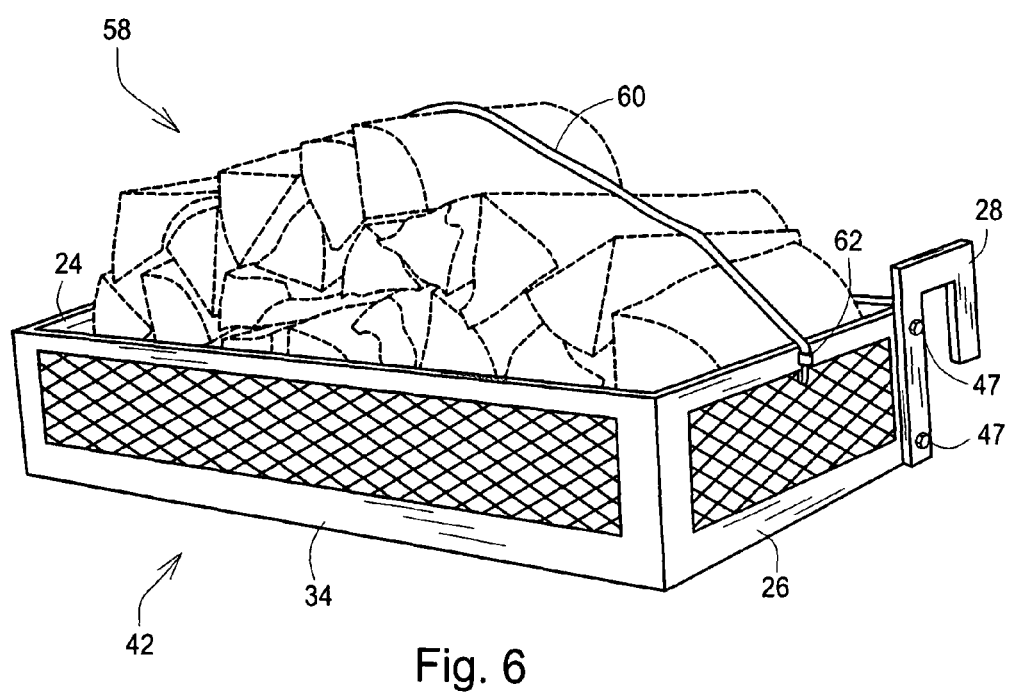

FIG. 6 is a perspective view of an alternate unmounted embodiment of the inventive cargo carrier 42 loaded with firewood 58. As shown in FIG. 6, the cargo maintained in the carrier 42, in this case chopped wood 58, is held down and secured by a bungee cord 60 spanning the top of the carrier 10 and secured through inserting of hooks 62 at each end of the bungee cord 60 into holes formed by the mesh side walls 24, 26 of the carrier 42. Alternately, hook ends 62 of bungee cord 60 could be inserted into holes 40 formed in solid side walls as shown in FIG. 2A.

In an alternate embodiment, the inventive carrier 10/42 is provided in a knockdown, kit-type embodiment. In this embodiment, the inventive cargo carrier 10/42 comprises a "bolt together" multiple piece kit assembly. In this embodiment, the assembly is bolted together to enable its disassembly for shipping or storage. In this manner, the inventive cargo carrier 10/42 may be disassembled and stacked compactly as for shipping in kit form, or for storage. The entire assembly can be broken down into, and packaged in boxes of 4 foot (1.22 m) lengths for ease of standard carrier shipping in standard-length containers.

A method for mounting the inventive cargo carrier 10 includes the steps of: (1) positioning the inboard side of the basket assembly generally parallel to the boat trailer rail in the general desired proximity for where the carrier is to be mounted along the length of the rail; (2) positioning the J-hook mounts of the carrier over and above the boat trailer rail; (3) slidably engaging the J-hook mounts over and around the boat trailer rail and permitting the J-hook mounts to slide downwards over the rail until the closed end of the J-hook mounts contact and rest on the boat trailer rail; (4) engaging the locking mechanism of at least one of the J-hook mounts through, for example, partially threading a bolt into the nut welded to the J-hook mount, or sliding a hasp of a padlock through the nut and locking the padlock; (5) loading the basket assembly with desired articles for transport; and, (6) securing the articles in the basket assembly with at least one cargo hold down tied to or hooked into holes in the side walls of the basket assembly and/or the floor/base portion. The cargo hold down could be one or more bungee cords, ropes, ties, or a combination thereof.

In the event spacers are required to reduce the size of the U-shaped opening of the J-hook mount to fit flush around the rail, one or more spacers may be placed (or stacked) on the rail prior to the step of slidably engaging the J-hook mounts over and around the boat trailer rail. Alternately, one or more spacers may be inserted into the U-shaped openings of the J-hook mounts prior to the step of slidably engaging the J-hook mounts over and around the boat trailer rail.

INDUSTRIAL APPLICABILITY

It is clear that the inventive package and article boat cargo carrier in this application has wide applicability to the boating industry, namely to recreational boaters seeking additional space for carrying equipment, materials, and supplies when towing boats to and from or between places where the boats are used or stored. The present invention provides additional cargo capacity that occupies otherwise unused space, and is especially useful, for example, as a place to carry and transport boat fuel, bait boxes, live catch boxes and the like, keeping them external to both the boat and the vehicle. The basket assembly which includes a continuous mesh floor allows the cargo carrier to be used to store and transport a variety of types of cargo of different sizes, dimensions, and parts, including tackle boxes, chopped wood, bags, and coolers of varying sizes. The trailer rails do not require modification, such as drilling of holes, welding of special brackets, or the like, to accept the inventive cargo carrier J-hook mounts, and the mounts may be inserted over rails of different widths using the adapters. Thus, the inventive carrier has the clear potential of becoming adopted as the new standard for apparatus and methods of increasing cargo space under these circumstances.

It should be understood that various modifications within the scope of this invention can be made by one of ordinary skill in the art without departing from the spirit thereof and without undue experimentation. For example, the mounting and locking method can have a wide range of designs to provide the functionalities disclosed herein. Likewise, the design and construction of the various sides and bottom of the inventive cargo carrier may use a variety of materials, techniques, and methods rather than those specifically described herein. This invention is therefore to be defined by the scope of the appended claims as broadly as the prior art will permit, and in view of the specification if need be, including a full range of current and future equivalents thereof.

PARTS LIST to assist examination; may be cancelled upon allowance at option of Examiner.

10 inventive cargo carrier
12 boat trailer
14 port rail
16 starboard rail
18 trailer tongue
20 boat
22 basket assembly
24 left side wall of basket assembly 22
26 right side wall of basket assembly 22
28 inverted J-hook mount (two)
30 locking mechanism
32 inboard side wall of basket assembly 22
34 outboard side wall of basket assembly 22
36 bottom or base
38 trailer wheel/tire
40 hole
42 mesh cargo carrier embodiment
44 wheel tracking line
46 nut/lock nut
47 bolt
48 padlock
50 bolted attachment
52 flange
54 base of rail
56 U shaped insert
58 chopped wood
60 cargo carrier hold down
62 hook end
"S" - Starboard
"P" - Port
"U" - U-shaped opening

We claim:

1. A cargo carrier for a boat trailer, said boat trailer comprising opposed port and starboard side rails, the carrier comprising in operative combination:

a generally rectangular box-shaped basket assembly, including a base portion formed with a mesh material, opposed inboard and outboard side walls, opposed left and right side walls, each of said side walls interconnecting said base; where at least one of said side walls is formed with a mesh material, where at least one hole opening is formed in at least one of said side walls, and where the outboard side wall does not extend past a wheel line of the trailer when the cargo carrier is mounted to the side rail of the boat trailer;

at least two spaced inverted J-hook mounts attached to said basket assembly, each of said J-hook mounts being shaped to form an inverted generally U-shaped opening, said opening having a closed top end and an open bottom end, each of said J-hook mounts further being shaped for slidable, removable hanger mounting over at least one side rail of said boat trailer;

at least one U-shaped adapter retained at an inside perimeter of the U-shaped opening formed by the inverted J-hook mount, at least one locking mechanism proximate the bottom end of the U-shaped opening of the J-hook mount, said locking mechanism comprising a lock nut welded to the J-hook mount proximate its open bottom end and a padlock, a hasp of said padlock capable of being slidably inserted through an opening formed by the nut; and, at least one cargo hold down, each of said hold downs including opposed attachment ends for attachment to the basket assembly.

2. The cargo carrier of claim 1, where the cargo hold down comprises at least one bungee cord with opposed hook ends.

3. The cargo carrier of claim 1, where the cargo hold down comprises rope.

4. The cargo carrier of claim 1, where said carrier parts do not exceed four feet in length and include connector elements to connect the respective parts of their full operational length to permit shipment of said carrier in standard-length containers.

5. A method of mounting a cargo carrier onto a rail of a boat trailer, said carrier comprising in operative combination a generally rectangular box-shaped basket assembly, including a base portion formed with a mesh material, opposed inboard and outboard side walls, opposed left and right side walls, each of said side walls interconnecting said base; where at least one of said side walls is formed with a mesh material, where at least one hole opening is formed in at least one of said side walls, and where the outboard side wall does not extend past a wheel line of the trailer when the cargo carrier is mounted to the side rail of the boat trailer; at least two spaced inverted J-hook mounts attached to said basket assembly, each of said J-hook mounts being shaped to form an inverted generally U-shaped opening, said opening having a closed top end and an open bottom end, each of said J-hook mounts further being shaped for slidable, removable hanger mounting over at least one side rail of said boat trailer; at least one U-shaped adapter retained at an inside perimeter of the U-shaped opening formed by the inverted J-hook mount; at least one locking mechanism proximate the bottom end of the U-shaped opening of the J-hook mount, said locking mechanism comprising a lock nut welded to the J-hook mount proximate its open bottom end and a padlock, a hasp of said padlock capable of being slidably inserted through an opening formed by the nut; and, at least one cargo hold down, each of said hold downs including opposed attachment ends for attachment to the basket assembly, said method comprising the operations of:

a) positioning the inboard side wall of the basket assembly generally parallel to the boat trailer rail in the general desired proximity for where the carrier is to be mounted along the length of the rail;

b) slidably engaging the U-shaped adapter over and around the boat trailer rail at a position corresponding to a location of the J-hook mounts when mounted along the length of the rail;

c) positioning the at least two J-hook mounts of the carrier over and above the boat trailer rail;

d) slidably engaging the J-hook mounts over and around the boat trailer rail and permitting the J-hook mounts to slide downwards over the rail until engaged within the U-shaped adapter;

e) engaging the locking mechanism of at least one of the J-hook mounts;

f) loading the basket assembly with at least one article; and, g) securing the at least one article in the basket assembly with at least one cargo hold down.

* * * * *